United States Patent
Yoo et al.

(10) Patent No.: US 12,456,739 B2
(45) Date of Patent: Oct. 28, 2025

(54) CATALYST FOR FUEL CELL, FUEL CELL COMPRISING THE SAME AND MANUFACTURING METHOD THEREOF

(71) Applicant: KOREA INSTITUTE OF SCIENCE AND TECHNOLOGY, Seoul (KR)

(72) Inventors: Sung Jong Yoo, Seoul (KR); Dong Wook Lee, Seoul (KR); Bora Seo, Seoul (KR); So Young Lee, Seoul (KR); Hee-Young Park, Seoul (KR); Hyun Seo Park, Seoul (KR); Jin Young Kim, Seoul (KR); Hyoung-Juhn Kim, Seoul (KR); Jong Hyun Jang, Seoul (KR); Daeil Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 659 days.

(21) Appl. No.: 17/862,644

(22) Filed: Jul. 12, 2022

(65) Prior Publication Data
US 2023/0163318 A1    May 25, 2023

(51) Int. Cl.
H01M 4/92    (2006.01)
(52) U.S. Cl.
CPC .................................. *H01M 4/926* (2013.01)
(58) Field of Classification Search
CPC ... B01J 23/42; B01J 23/44; B01J 23/46; B01J 23/74; B01J 23/8906; B01J 23/8913; B01J 23/892; H01M 4/926
USPC .................. 502/113, 182, 185; 429/523–527
See application file for complete search history.

(56) References Cited

U.S. PATENT DOCUMENTS

| | | | |
|---|---|---|---|
| 7,759,277 B2 * | 7/2010 | Fukazawa | H01M 4/8867 502/313 |
| 11,081,703 B2 * | 8/2021 | Park | B01J 37/00 |
| 2009/0136826 A1 * | 5/2009 | Yoshida | H01M 4/921 502/339 |
| 2010/0316930 A1 * | 12/2010 | Shao | H01M 4/8647 977/775 |

(Continued)

FOREIGN PATENT DOCUMENTS

KR    10-0774590 B1    11/2007
KR    10-2012-0089119 A    8/2012

(Continued)

OTHER PUBLICATIONS

Guangfang Grace Li et al., "Galvanic Replacement-Driven Transformations of Atomically Intermixed Bimetallic Colloidal Nanocrystals: Effects of Compositional Stoichiometry and Structural Ordering." American Chemical Society, Langmuir, 34, pp. 4340-4350. (Year: 2018).*

(Continued)

*Primary Examiner* — Patricia L. Hailey
(74) *Attorney, Agent, or Firm* — NSIP Law

(57) ABSTRACT

The present disclosure relates to a catalyst for a fuel cell, a fuel cell including the same and a method for preparing the catalyst for a fuel cell. More specifically, the catalyst for a fuel cell according to the present disclosure can exhibit superior catalytic activity as compared to the existing catalyst even when the catalyst metal is used at a very low content because some metal of the metal nanoparticles distributed on a carbon support is replaced with catalyst metal single atoms.

10 Claims, 14 Drawing Sheets

(56) References Cited

U.S. PATENT DOCUMENTS

| | | | |
|---|---|---|---|
| 2012/0196207 A1 | 8/2012 | Yoo et al. | |
| 2013/0177838 A1* | 7/2013 | Wang | B01J 23/468 |
| | | | 429/525 |
| 2013/0344421 A1* | 12/2013 | Montaut | H01M 4/88 |
| | | | 977/773 |
| 2014/0154609 A1* | 6/2014 | Yoo | H01M 4/921 |
| | | | 429/525 |
| 2018/0309137 A1 | 10/2018 | Kim | |

FOREIGN PATENT DOCUMENTS

| | | | | |
|---|---|---|---|---|
| KR | 10-2018-0039444 A | | 4/2018 | |
| KR | 10-2018-0117808 A | | 10/2018 | |
| KR | 20200053431 A | * | 5/2020 | ............ H01M 4/92 |
| KR | 10-2021-0048170 A | | 5/2021 | |

OTHER PUBLICATIONS

Anthanasios Papaderakis, "Ternary Pt—Ru—Ni Catalytic Layers for Methanol Electrooxidation Prepared by Electrodeposition and Galvanic Replacement," Frontiers in Chemistry, vol. 2, Art. 29, pp. 1-11. (Year: 2014).*

* cited by examiner

Position

CATALYST FOR FUEL CELL, FUEL CELL COMPRISING THE SAME AND MANUFACTURING METHOD THEREOF

CROSS-REFERENCE TO RELATED APPLICATION

This application claims priority to Korean Patent Application No. 10-2021-0162000 filed on Nov. 23, 2021, and all the benefits accruing therefrom under 35 U.S.C. § 119, the contents of which in its entirety are herein incorporated by reference.

BACKGROUND

1. Field

The present disclosure relates to a catalyst for a fuel cell, fuel cell including the same and a method for preparing the catalyst for a fuel cell.

2. Description of Related Art

Hydrogen oxidation reaction (HOR) occurring in a fuel electrode (oxidation electrode, anode) of a fuel cell is a major reaction that affects the performance of the fuel cell. At present, precious metals such as platinum that exhibit superior catalytic activity are mainly used as fuel electrode catalysts. However, it is difficult to commercialize platinum due to the carbon monoxide poisoning issue. Therefore, researches are being conducted on the development of a fuel electrode catalyst for a fuel cell, which is resistant to poisoning by carbon monoxide and sulfur included in reformed hydrogen and thus can prevent the deterioration of fuel cell performance. At present, in order to mitigate the carbon monoxide poisoning of platinum, a PtRu/C catalyst wherein ruthenium (Ru) is introduced as a cocatalyst is widely used. The PtRu/C catalyst is known to have improved resistance to carbon monoxide as the intensity of carbon monoxide adsorption/desorption on the surface of platinum (Pt) is decreased and the amount of carbon monoxide adsorbed on the platinum (Pt) surface is reduced due to the introduction of ruthenium (Ru) which forms an alloy with platinum (Pt). In addition, since the precious metal is expensive and the deposits are limited, development of a catalyst for a fuel cell, which can improve the carbon monoxide poisoning issue and reduce the use of the catalyst metal while maintaining catalytic activity, is necessary.

REFERENCES OF THE RELATED ART

Patent Documents

Patent document 1. Korean Patent Publication No. 10-2018-0117808.

SUMMARY

The present disclosure is directed to providing a catalyst for a fuel cell, wherein some metal of metal nanoparticles distributed on a carbon support is replaced with catalyst metal single atoms and thus superior catalytic activity can be achieved even with a very small content of catalyst metal, a fuel cell including the same, and a method for preparing a catalyst for a fuel cell by distributing metal nanoparticles on a carbon support and then replacing some of the metal of the metal nanoparticles with catalyst metal single atoms by galvanic replacement in order to reduce environmental and economic costs.

In an aspect, the present disclosure provides a catalyst for a fuel cell, which includes: a carbon support; and metal nanoparticles distributed on the carbon support, wherein some metal of the metal nanoparticles is replaced with catalyst metal single atoms.

In another aspect, the present disclosure provides a fuel cell including the catalyst for a fuel cell.

In another aspect, the present disclosure provides a method for preparing a catalyst for a fuel cell, which includes: (A) preparing a mixture solution by adding a carbon support, a metal precursor and a surfactant to a first solvent; (B) preparing a metal/carbon composite wherein metal nanoparticles are distributed on the carbon support by adding a reducing agent to the mixture solution and conducting reaction; and (C) preparing a catalyst for a fuel cell by adding the metal/carbon composite and a catalyst metal precursor to a second solvent to replace some metal of the metal nanoparticles with catalyst metal single atoms.

In the catalyst for a fuel cell of the present disclosure, the catalyst metal is distributed uniformly on the metal nanoparticles because some metal of the metal nanoparticles is replaced with catalyst metal single atoms. In addition, superior catalytic activity may be achieved even when the content of the catalyst metal is low.

In addition, according to the method for preparing a catalyst for a fuel cell of the present disclosure, a catalyst for a fuel cell wherein catalyst metal single atoms are uniformly distributed on the surface of metal nanoparticles at a very low content can be prepared by a very simple galvanic replacement method at room temperature.

DETAILED DESCRIPTION

Figure 1:
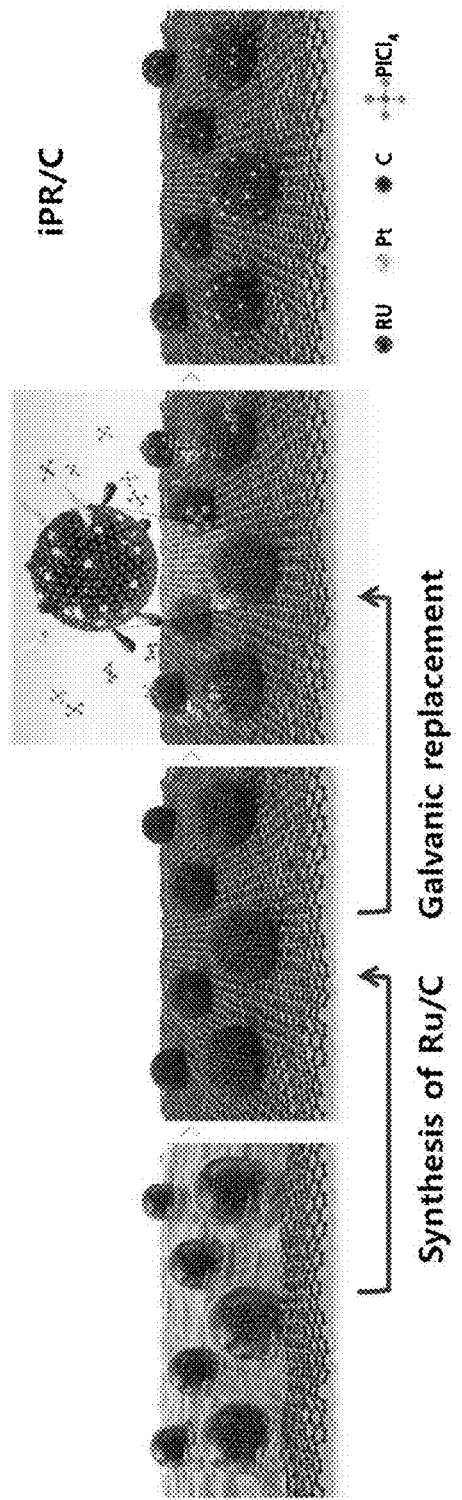
FIG. 1 schematically illustrates a method for preparing a catalyst for a fuel cell according to the present disclosure.

Hereinafter, the present disclosure will be described more specifically referring to the attached drawings and examples.

In an aspect, the present disclosure provides a catalyst for a fuel cell, which includes: a carbon support; and metal nanoparticles distributed on the carbon support, wherein some metal of the metal nanoparticles is replaced with catalyst metal single atoms.

The structure of the catalyst for a fuel cell according to the present disclosure wherein some metal of the metal nanoparticles is replaced with catalyst metal single atoms can be identified by transmission electron microscopy (TEM) analysis, X-ray photoelectron spectroscopy (XPS) analysis and line profile analysis of scanning transmission electron microscopy (STEM) images.

More specifically, the catalyst for a fuel cell of the present disclosure may not exhibit a peak corresponding to $Pt^0$ as a result of X-ray photoelectron spectroscopy (XPS) analysis since some metal of the metal nanoparticles is replaced with catalyst metal single atoms.

In addition, the height of a region corresponding to the catalyst metal in a line profile analysis result of a scanning transmission electron microscopy (STEM) image may be higher than the height of a region corresponding to the metal of the metal nanoparticles since some metal of the metal nanoparticles is replaced with catalyst metal single atoms, which is heavier metal than the metal.

The carbon support may be one or more selected from a group consisting of Vulcan, carbon black, graphite carbon, acetylene black, Ketjen black, carbon nanotube, carbon nanowire and carbon nanorod.

The metal nanoparticle may be one or more selected from a group consisting of ruthenium (Ru), nickel (Ni), cobalt (Co) and iron (Fe). Most specifically, it may be ruthenium. In particular, ruthenium is advantageous in that it can facilitate the oxidation of carbon monoxide owing to high oxophilicity.

The catalyst metal single atom may be one or more selected from a group consisting of platinum, rhodium, palladium, osmium, ruthenium and iridium.

In an exemplary embodiment of the present disclosure, the catalyst for a fuel cell may be one in which some metal of the metal nanoparticle is replaced with catalyst metal single atoms by galvanic replacement, and the standard reduction potential of the metal may be lower than the standard reduction potential of the catalyst metal. A combination of the metal nanoparticles and the catalyst metal may be a combination of iron and rhodium, a combination of cobalt and palladium or a combination of ruthenium platinum. In particular, a combination of ruthenium and platinum enables the oxidation of carbon monoxide adsorbed on platinum to carbon dioxide as the ruthenium having very high oxophilicity attracts oxygen species (—OH) existing in an electrolyte.

The molar ratio of the metal nanoparticles and the catalyst metal single atoms may be 100:0.3-7.5, specifically 100:0.4-5. If the molar ratio is lower than 100:0.3, catalytic activity may decrease significantly because the amount of catalyst metal single atoms replacing some metal of the metal nanoparticles is decreased. And, if it exceeds 100:7.5, platinum nanoparticles may grow by using the platinum single atoms as seeds.

The metal nanoparticles may have a diameter of 2-10 nm.

The catalyst for a fuel cell of the present disclosure, wherein some metal of the metal nanoparticles is replaced with catalyst metal single atoms, may significantly reduce the amount of catalyst metal single atoms necessary for achieving the same catalyst performance as compared to the existing catalyst. More specifically, the catalyst metal single atoms may be included in an amount of 0.5-3 wt %, specifically 0.8-2 wt %, based on 100 wt % of the catalyst for a fuel cell. If the catalyst metal single atoms are included in an amount less than 0.5 wt %, catalytic activity may not be achieved. And, if they are included in an amount exceeding 3 wt %, the increase in catalytic activity may be insignificant when considering the preparation cost.

The catalyst for a fuel cell according to the present disclosure may not exhibit a peak corresponding to the catalyst metal as a result of X-ray diffraction (XRD) since the catalyst metal exists as single atoms.

In another aspect, the present disclosure provides a fuel cell including the catalyst for a fuel cell.

In another aspect, the present disclosure provides a method for preparing a catalyst for a fuel cell, which includes: (A) preparing a mixture solution by adding a carbon support, a metal precursor and a surfactant to a first solvent; (B) preparing a metal/carbon composite wherein metal nanoparticles are distributed on the carbon support by adding a reducing agent to the mixture solution and conducting reaction; and (C) preparing a catalyst for a fuel cell by adding the metal/carbon composite and a catalyst metal precursor to a second solvent to replace some metal of the metal nanoparticles with catalyst metal single atoms.

FIG. 1 schematically illustrates a method for preparing a catalyst for a fuel cell according to the present disclosure. Hereinafter, each step of the method for preparing a catalyst for a fuel cell of the present disclosure will be described in more detail referring to FIG. 1.

(A) Preparation of Mixture Solution by Adding Carbon Support, Metal Precursor and Surfactant to First Solvent In the step (A), a mixture solution is prepared for preparation of a metal/carbon composite by adding a carbon support, a metal precursor and a surfactant to a first solvent.

The first solvent is not specially limited as long as it is a solvent that can dissolve a precursor for preparation of a metal/carbon composite. For example, one or more selected from a group consisting of ethanol, distilled water and ethylene glycol may be used.

As the metal precursor, a precursor of a metal whose standard reduction potential is lower than that of the catalyst metal should be selected for the galvanic replacement in the step (C) which will be described later. It may be a precursor to one or more metal selected from a group consisting of ruthenium, cobalt, nickel and iron. Most specifically, it may be ruthenium chloride which is a precursor to ruthenium.

The surfactant serves to induce uniform distribution of the metal nanoparticles and may be one or more selected from a group consisting of oleylamine, octadecylamine and hexadecylamine.

The mixture solution may contain the surfactant at a concentration of 0.5-10 mM. If the concentration of the surfactant is below 0.5 mM, the size of the formed metal nanoparticles may be excessively large. And, if it exceeds 10 mM, the size of the nanoparticles is decreased but active sites may be shielded by carbon shells formed on the surface of the nanoparticles.

If the surfactant remains in the catalyst for a fuel cell, catalytic activity may be decreased because carbon shells formed on the surface of the catalyst cover the active sites. Therefore, in an exemplary embodiment of the present disclosure, a heat treatment step may be included after the step (A). The heat treatment may be performed at 200-400° C.

(B) Preparation of Metal/Carbon Composite wherein Metal Nanoparticles are Distributed on Carbon Support by Adding Reducing Agent to Mixture Solution and Conducting Reaction In the step (B), metal nanoparticles uniformly distributed on the carbon support are prepared by reducing the metal precursor in the mixture solution.

The reducing agent may be one or more selected from a group consisting of sodium borohydride ($NaBH_4$), ethylene glycol and hydrazine.

The reaction may be conducted for 3-10 hours, specifically 4-8 hours. It was confirmed that metal nanoparticles having a diameter of 2-10 nm are formed when the reaction is conducted for 3-10 hours.

(C) Preparation of Catalyst for Fuel Cell by Adding Metal/Carbon Composite and Catalyst Metal Precursor to Second Solvent to Replace some Metal of Metal Nanoparticles with Catalyst Metal Single Atoms In the step (C), some metal of the metal nanoparticles of the metal/carbon composite is replaced with catalyst metal single atoms by galvanic replacement. Some of the catalyst metal may be replaced spontaneously without energy supply from outside by utilizing the difference in standard reduction potentials.

The second solvent may be one or more selected from a group consisting of water, ethanol and ethylene glycol, although not being specially limited thereto.

Since the step (C) may proceed spontaneously without energy supply from outside by utilizing the difference in standard reduction potentials, it may be conducted at room temperature without artificial heating or cooling. More specifically, the room temperature may refer to a temperature of 10-60° C. If the temperature in the step (C) is below 10° C., the speed of galvanic replacement may be very slow. And, if it exceeds 60° C., the catalyst metal may not exist as single atoms because the speed of galvanic replacement becomes very fast.

The catalyst metal precursor may be a precursor to one or more metal selected from a group consisting of platinum, rhodium, palladium, osmium, ruthenium and iridium. Most specifically, the catalyst metal may be platinum, and the platinum precursor may be specifically platinum chloride, platinum oxide, platinum nitrate, platinum sulfate, platinum cyanide or a mixture thereof.

The step (C) may be performed at room temperature for 10-14 hours, specifically for 11-13 hours. If the step (C) is performed for shorter than 10 hours, the prepared catalyst for a fuel cell may exhibit low catalytic activity since the catalyst metal is not replaced sufficiently and the content of catalyst metal single atoms is significantly low. A reaction time exceeding 14 hours is unnecessary because the galvanic replacement has been completed sufficiently and no more galvanic replacement occurs.

The molar ratio of the metal nanoparticles and the catalyst metal single atoms may be 100:0.3-7.5, specifically 100:0.4-5.

After the step (C), the solution obtained by adding the metal/carbon composite and the catalyst metal precursor to the second solvent may be dried at 50-70° C. for 1-5 hours.

The catalyst for a fuel cell may not exhibit a peak corresponding to $Pt^0$ as a result of X-ray photoelectron spectroscopy (XPS) analysis since some metal of the metal nanoparticles is replaced with catalyst metal single atoms.

The height of a region corresponding to the catalyst metal in a line profile analysis result of a scanning transmission electron microscopy (STEM) image of the catalyst for a fuel cell may be higher than the height of a region corresponding to the metal of the metal nanoparticles since some metal of the metal nanoparticles is replaced with catalyst metal single atoms, which is heavier metal than the metal.

The catalyst metal single atoms may be included in an amount of 0.5-3 wt %, specifically 0.8-2 wt %, based on 100 wt % of the catalyst for a fuel cell.

The catalyst for a fuel cell may not exhibit a peak corresponding to the catalyst metal as a result of X-ray diffraction (XRD) analysis.

Although it was not described explicitly in the following examples and comparative examples, catalysts for a fuel cell according to the present disclosure were prepared by varying the components and mixing ratios thereof and the reaction time of each step. After conducting hydrogen oxidation reaction for 300 cycles by using the catalysts, the surface was observed with a scanning electron microscope.

As a result, surprisingly it is observed that superior catalyst performance may be maintained for 300 cycles of hydrogen oxidation reaction only when all of the following conditions are satisfied. When any of the following conditions is not satisfied, catalyst performance is observed to decrease continuously for 300 cycles of hydrogen oxidation reaction.

(i) the carbon support is Vulcan,
(ii) the metal precursor is ruthenium chloride,
(iii) the surfactant is oleylamine,
(iv) the mixture solution contains the surfactant at a concentration of 0.5-10 mM, and
(v) heat treatment is performed after the step (A), Further, also surprisingly, it is observed that the loss of the catalyst metal did not occur, thus achieving superior stability and durability of the cell, only when all of the following conditions are satisfied. When any of the following conditions is not satisfied, the superior stability and durability may not be achieved due to the loss of the catalyst metal.

(vi) the reducing agent is sodium borohydride ($NaBH_4$), and the reaction in the step (B) is conducted for 4-8 hours,
(vii) the metal nanoparticles have a diameter of 2-10 nm, and the catalyst metal precursor is platinum chloride,
(viii) the step (C) is performed at room temperature for 11-13 hours, and the molar ratio of the metal nanoparticles and the catalyst metal single atoms is 100:0.4-5,
(ix) the catalyst for a fuel cell does not exhibit a peak corresponding to $Pt^0$ as a result of X-ray photoelectron spectroscopy (XPS) analysis, and the height of a region corresponding to the catalyst metal in a line profile analysis result of a scanning transmission electron microscopy (STEM) image of the catalyst for a fuel cell is higher than the height of a region corresponding to the metal of the metal nanoparticles,
(x) the catalyst metal single atoms are included in an amount of 0.8-2 wt % based on 100 wt % of the catalyst for a fuel cell, and the catalyst for a fuel cell does not exhibit a peak corresponding to the catalyst metal as a result of X-ray diffraction (XRD) analysis.

EXAMPLE 1 iPR/C

Preparation of Ru/C

After sufficiently dispersing 100 mg of Vulcan 72X (carbon) in anhydrous ethanol together with 1 mL of oleylamine, a mixture solution was prepared by adding 51.3 mg of $RuCl_3 \cdot xH_2O$ and then dispersing the same. The concentration of oleylamine in the mixture solution was 8 mM. Then, after adding 280.7 mg of sodium borohydride ($NaBH_4$) to the mixture solution, a Ru/C catalyst was obtained by conducting reaction sufficiently for 6 hours. Then, the Ru/C catalyst was heat-treated primarily at 250° C. under air atmosphere for 1 hour and then heat-treated secondarily at 300° C. under 5% $H_2$/Ar atmosphere for 1 hour in order to remove remaining oleylamine.

iPR/C

The synthesized Ru/C was dispersed sufficiently in purified distilled water using a sonic bath and a $PtCl_4$ dispersion was added after stirring. Subsequently, the mixture solution was stirred for 12 hours for sufficient galvanic replacement. Then, an iPR/C catalyst was obtained by repeating the procedure of filtering the stirred solution through filter paper and washing with distilled water several times and then completely drying water in a 60° C. vacuum oven for 2 hours. The content of platinum based on 100 wt % of the prepared iPR/C was 0.98 wt %, and the molar ratio of ruthenium and platinum was 100:0.5.

COMPARATIVE EXAMPLE 1

Pt/C

A commercial catalyst purchased from Johnson Matthey wherein 20 wt % of platinum is supported on a carbon support was used.

COMPARATIVE EXAMPLE 2

Ru/C

After sufficiently dispersing 100 mg of Vulcan 72X (carbon) in anhydrous ethanol together with 1 mL of oleylamine, a mixture solution was prepared by adding 51.3 mg of $RuCl_3 \cdot xH_2O$ and then dispersing the same. The concentration of oleylamine in the mixture solution was 8 mM. Then, after adding 280.7 mg of sodium borohydride ($NaBH_4$) to the mixture solution, a Ru/C catalyst was obtained by conducting reaction sufficiently for 6 hours. Then, the Ru/C catalyst was heat-treated primarily at 250° C. under air atmosphere for 1 hour and then heat-treated secondarily at 300° C. under 5% $H_2$/Ar atmosphere for 1 hour in order to remove remaining oleylamine.

TEST EXAMPLE 1

TEM Analysis

The structure of the catalysts prepared in Example 1 and Comparative Example 1 was analyzed by transmission electron microscopy. The result is shown in FIGS. 2-3.

Figure 2A:
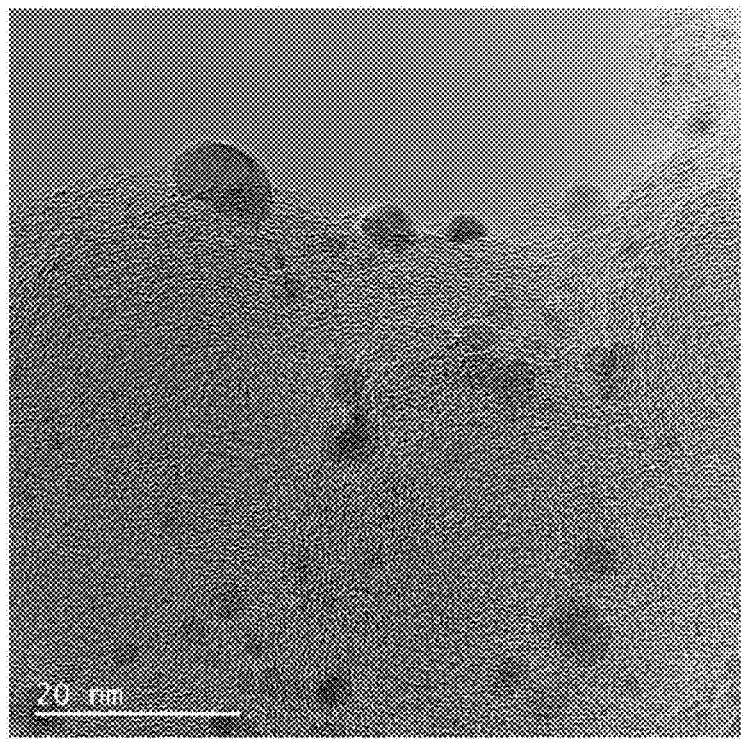
FIGS. 2A to 2E show the transmission electron microscopy (TEM) images of catalysts prepared in Example 1 (FIGS. 2A to 2C), Comparative Example 1 (FIG. 2D) and Comparative Example 2 (FIG. 2E).
Figure 2B:
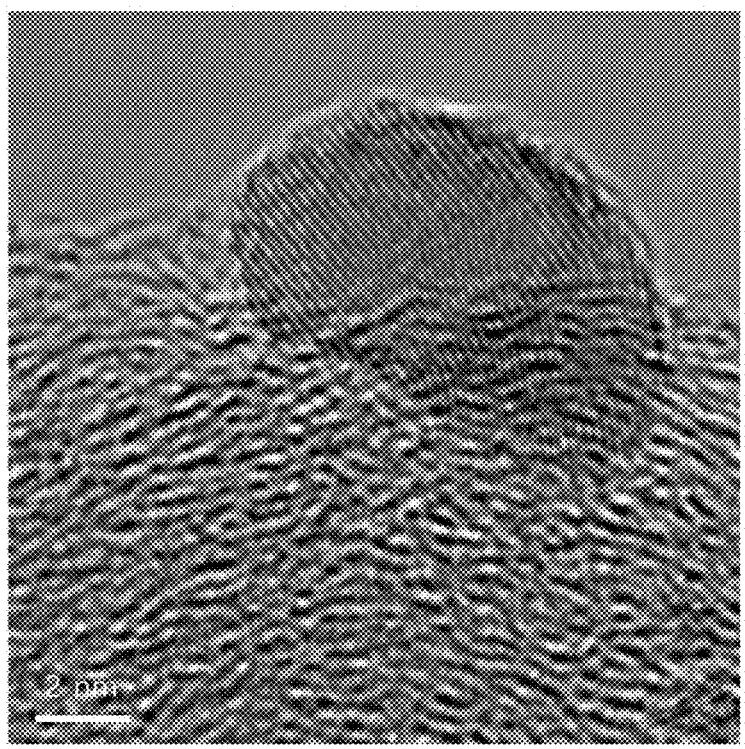
Figure 2C:
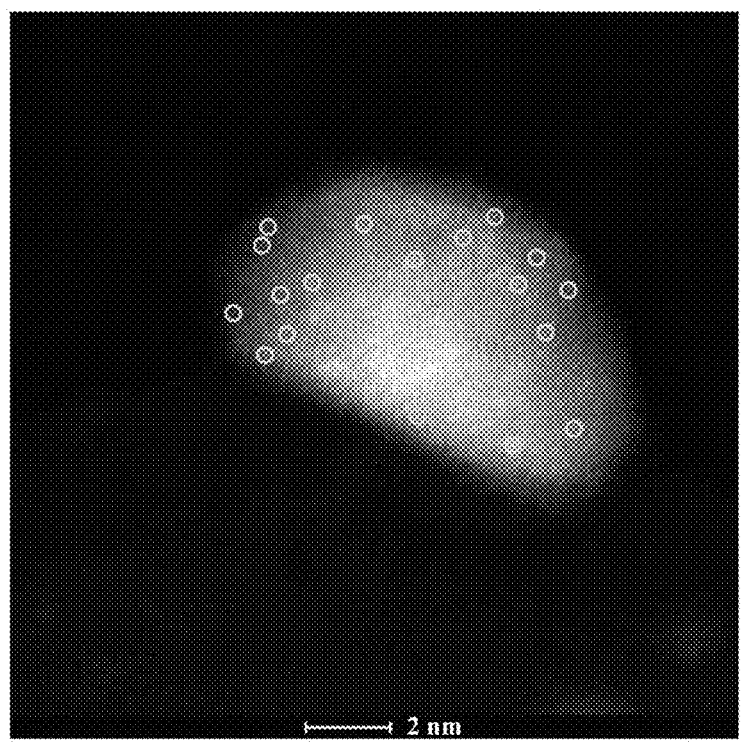
Figure 2D:
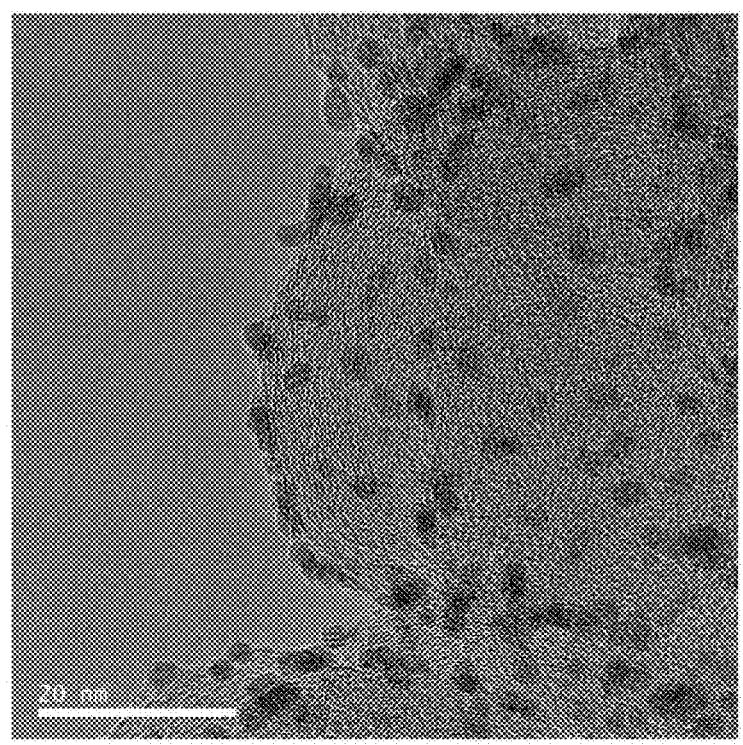
Figure 2E:
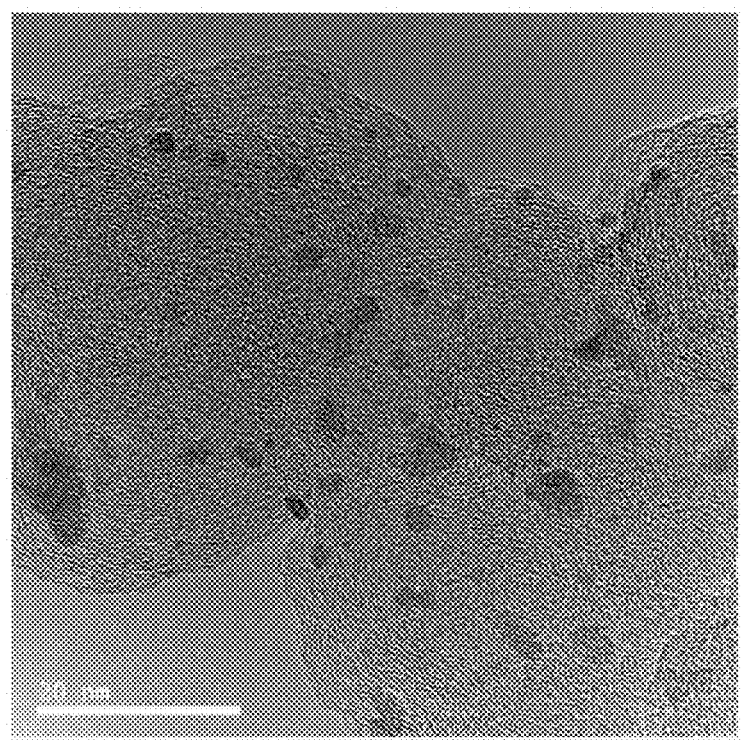

FIGS. 2A to 2E show the transmission electron microscopy (TEM) images of the catalysts prepared in Example 1 (FIGS. 2A to 2C), Comparative Example 1 (FIG. 2D) and Comparative Example 2 (FIG. 2E).

Figure 3A:
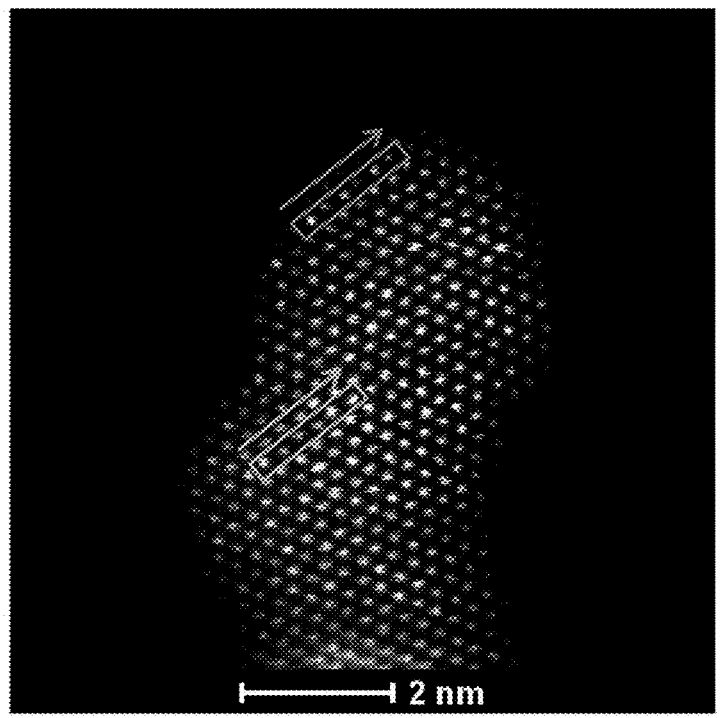
FIGS. 3A and 3B show the scanning transmission electron microscopy (STEM) image of a catalyst prepared in Example 1 (FIG. 3A) and the line profile analysis result of the scanning transmission electron microscopy (STEM) image (FIG. 3B).
Figure 3B:
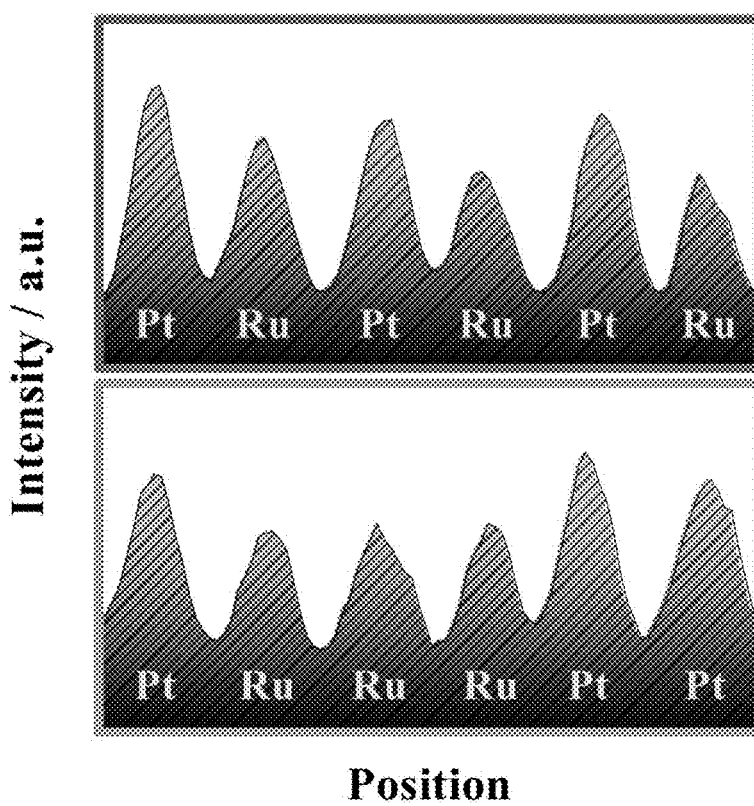

FIGS. 3A and 3B show the scanning transmission electron microscopy (STEM) image of the catalyst prepared in Example 1 (FIG. 3A) and the line profile analysis result of the scanning transmission electron microscopy (STEM) image (FIG. 3B).

Referring to FIGS. 2A to 2E, platinum formed platinum nanoparticles with a size of 2-3 nm in Comparative Example 1 (Pt/C), and ruthenium nanoparticles with a size of 2-10 nm were uniformly distributed on carbon in Comparative Example 2 (Ru/C) and Example 1 (iPR/C). Also, referring to FIGS. 2-3, platinum single atoms were distributed uniformly on ruthenium nanoparticles in Example 1.

TEST EXAMPLE 2

XRD Analysis

The structure of the catalysts prepared in Example 1 and Comparative Example 2 was analyzed by X-ray diffraction. The result is shown in FIG. 4.

Figure 4:
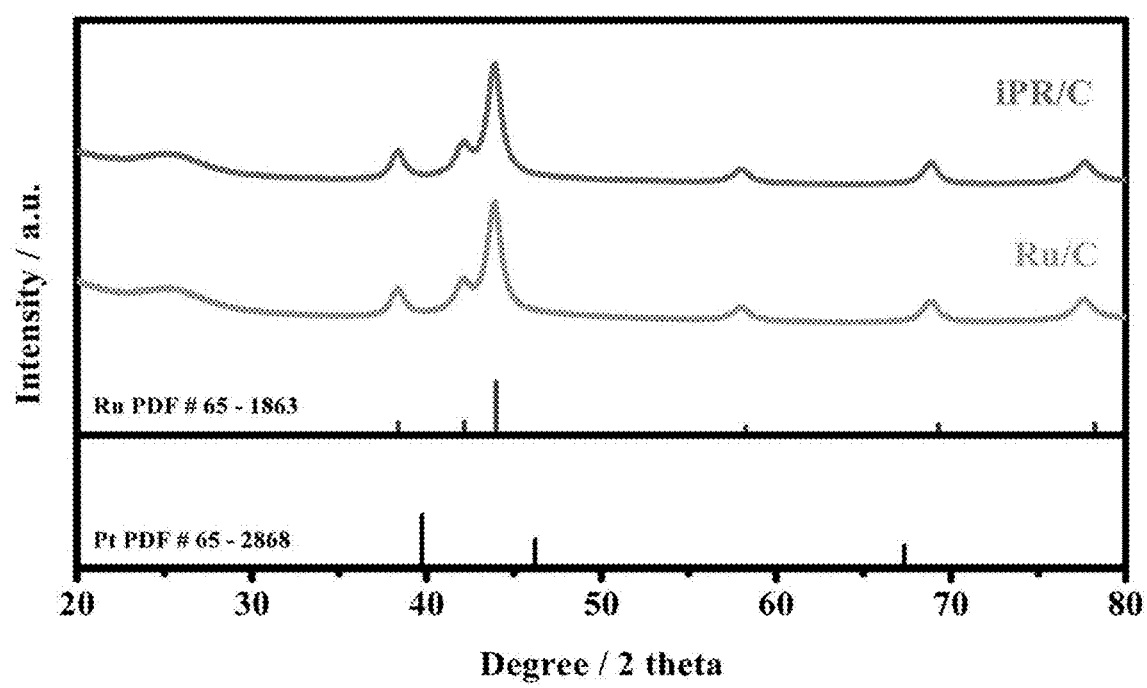
FIG. 4 shows the X-ray diffraction analysis result of catalysts prepared in Example 1 (iPR/C) and Comparative Example 2 (Ru/C).

FIG. 4 shows the X-ray diffraction analysis result of the catalysts prepared in Example 1 (iPR/C) and Comparative Example 2 (Ru/C). Referring to FIG. 4, the diffraction peaks of ruthenium were observed in both Comparative Example 2 (Ru/C) and Example 1 (iPR/C). Although Example 1 (iPR/C) includes platinum, the characteristic diffraction peak of platinum was not detected, which suggests that platinum exists as single atoms.

TEST EXAMPLE 3

XPS Analysis

The surface electronic structure of the catalysts prepared in Example 1 and Comparative Example 1 was analyzed by X-ray photoelectron spectroscopy (XPS). The results are shown in FIGS. 5A to 5C.

Figure 5A:
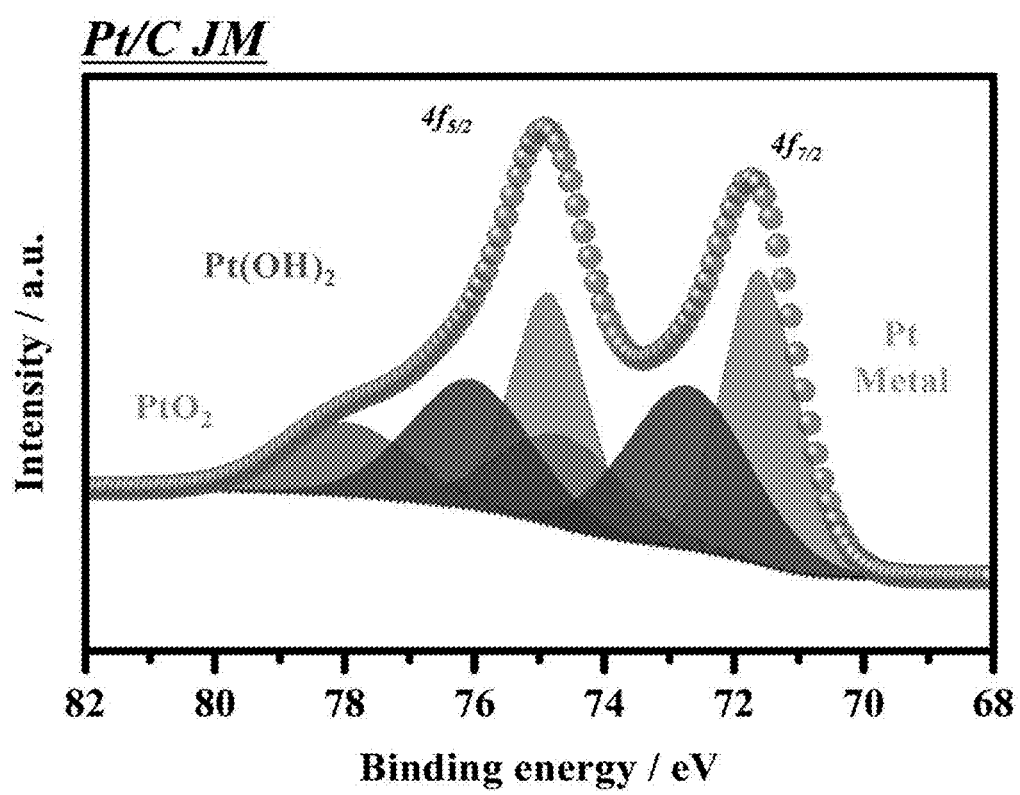
FIGS. 5A to 5C show X-ray photoelectron spectroscopy (XPS) analysis results of catalysts prepared in Comparative Example 1 (Pt/C) (FIG. 5A) and Example 1 (iPR/C) (FIG. 5B) and the valence state ratio of platinum (FIG. 5C).
Figure 5B:
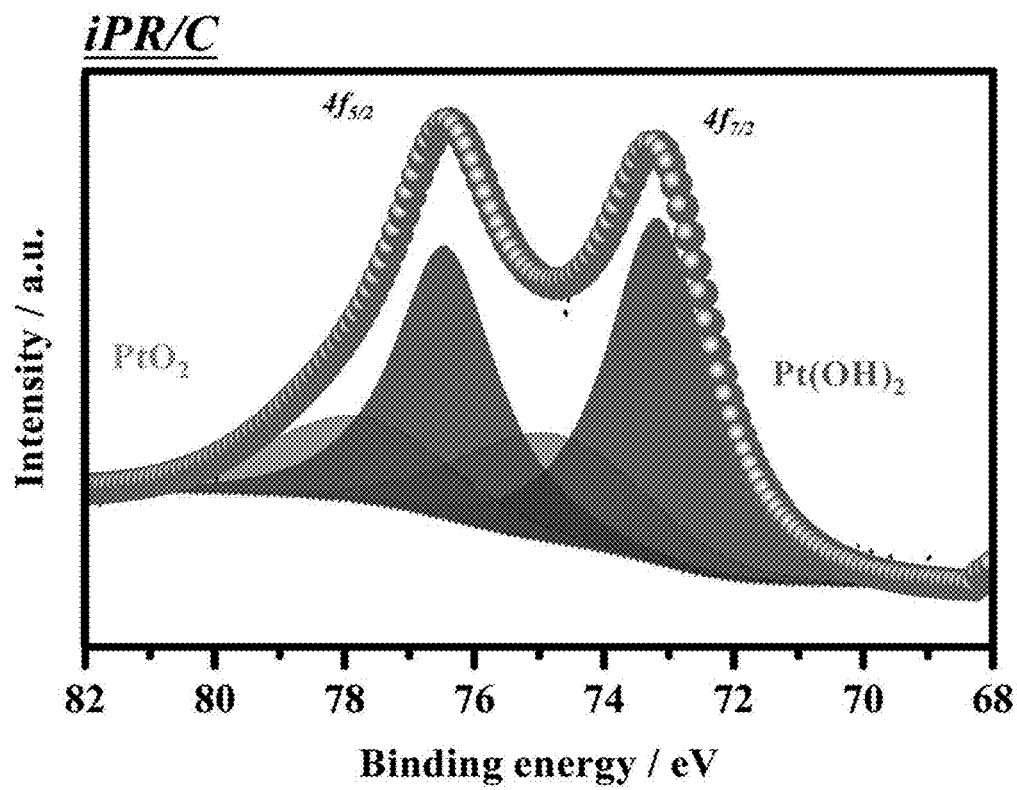
Figure 5C:
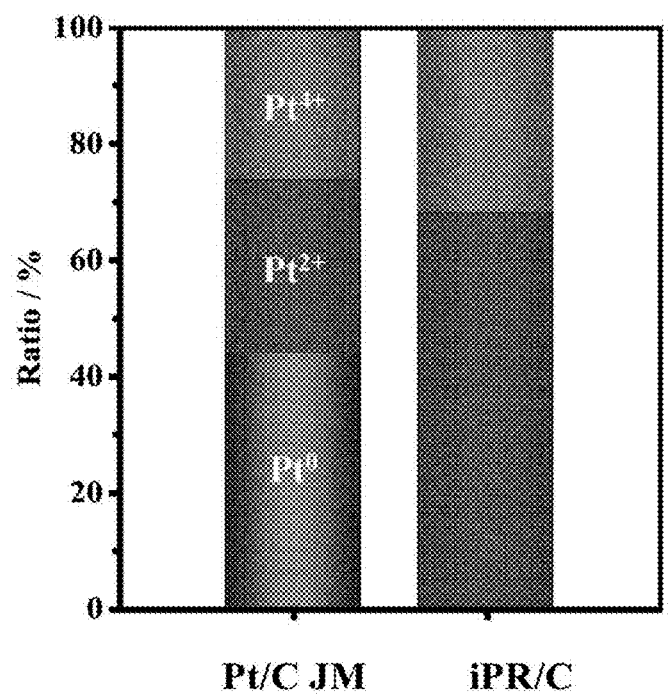

FIGS. 5A to 5C show the X-ray photoelectron spectroscopy (XPS) analysis result of the catalysts prepared in Comparative Example 1 (Pt/C) (FIG. 5A) and Example 1 (iPR/C) (FIG. 5B) and the valence state ratio of platinum (FIG. 5C). Referring to FIGS. 5A to 5C, the catalyst prepared in Example 1 showed no peak corresponding to $Pt^0$, which is because platinum exists as single atoms. In addition, Example 1 had higher binding energy than Comparative Example 1 because the surface electronic structure was changed due to the rehybridization of s, p and d orbitals of platinum caused by the electron transfer between Pt and Ru. The positive shift of the binding energy means the downshift of the d-band center. Through this, it was confirmed that the catalyst of Example 1 has improved performance and can provide a condition where carbon monoxide can be oxidized faster by decreasing adsorption energy.

TEST EXAMPLE 4

Evaluation of Half-Cell Performance

The performance of half-cells using the catalysts prepared in Example 1 and Comparative Examples 1-2 was measured using a rotating disk electrode (RDE) and the results are shown in FIGS. 6A to 6D. A catalyst slurry for the measurement was prepared by mixing 5 mg of the catalyst, 100 μL of a 5 wt % Nafion solution and 1 mL of IPA and 5 μL was loaded on glassy carbon. All the reaction was conducted in a 0.1 M $HClO_4$ electrolyte. Hydrogen oxidation reaction was measured at −0.05 V to 1.0 V under a hydrogen gas-saturated condition at a rotation speed of 1600 rpm. CO stripping and CO bulk oxidation were measured in a CO-saturated electrolyte at 0.05 V to 1.05 V.

FIGS. 6A to 6D show the results of evaluating the hydrogen oxidation reaction (FIGS. 6A and 6B) and the resistance to carbon monoxide poisoning (FIGS. 6C and 6D) of the half-cells using the catalysts prepared in Example 1 (iPR/C), Comparative Example 1 (Pt/C) and Comparative Example 2 (Ru/C).

Figure 6A:
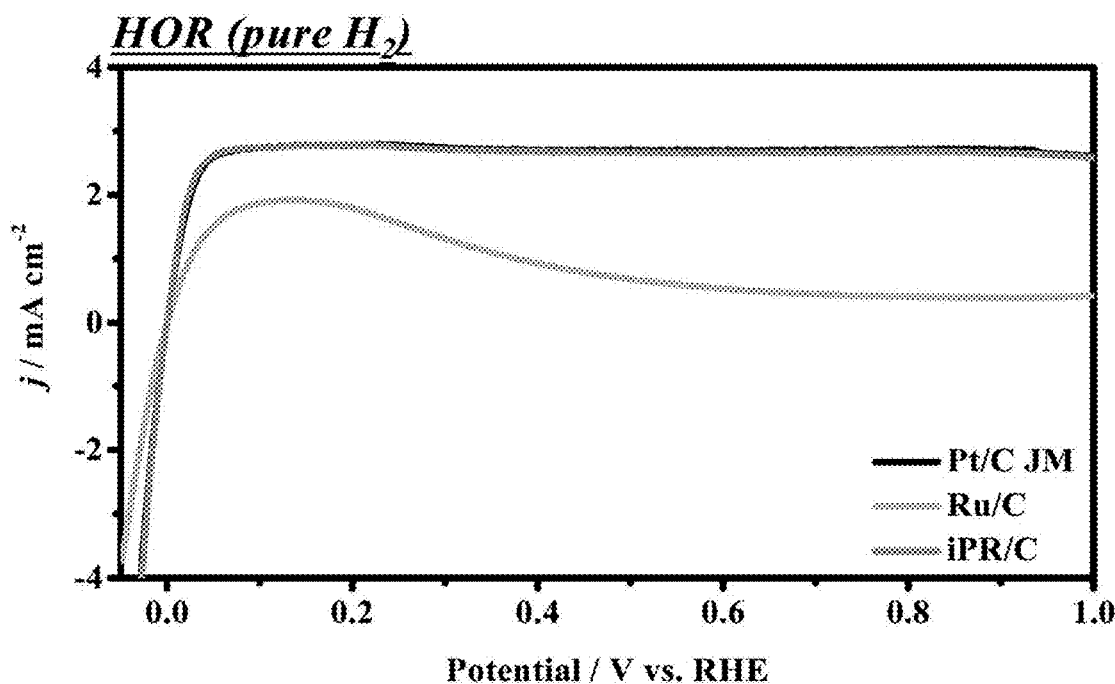
FIGS. 6A to 6D show results of evaluating the hydrogen oxidation reaction (FIGS. 6A and 6B) and resistance to carbon monoxide poisoning (FIGS. 6C and 6D) of half-cells using catalysts prepared in Example 1 (iPR/C), Comparative Example 1 (Pt/C) and Comparative Example 2 (Ru/C).
Figure 6B:
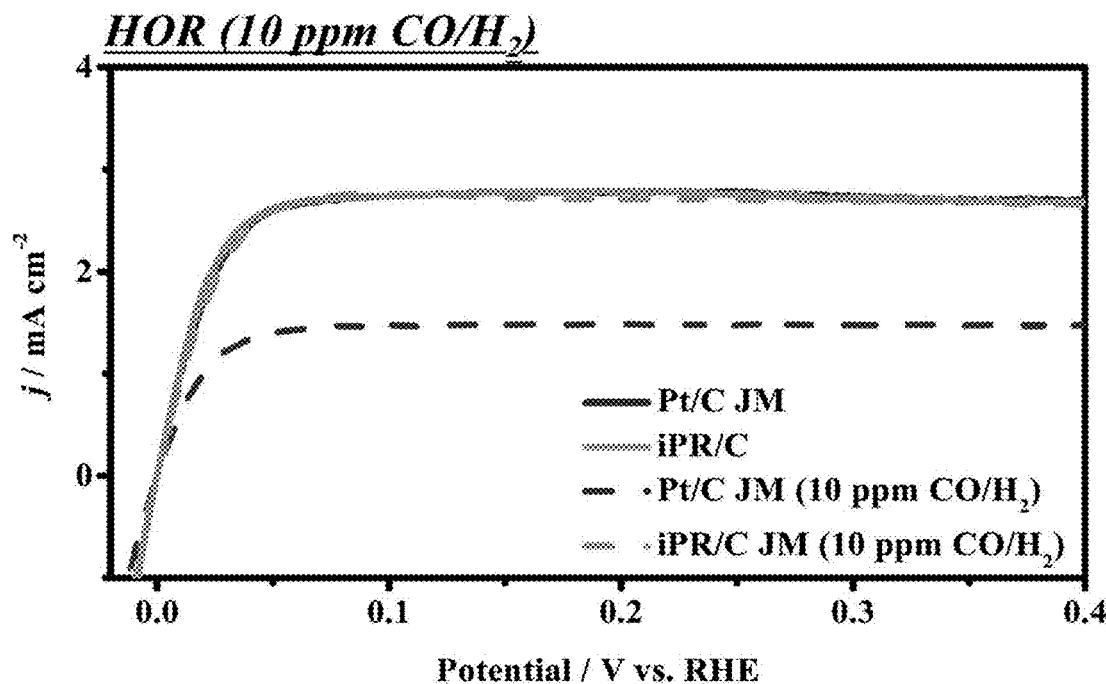
Figure 6C:
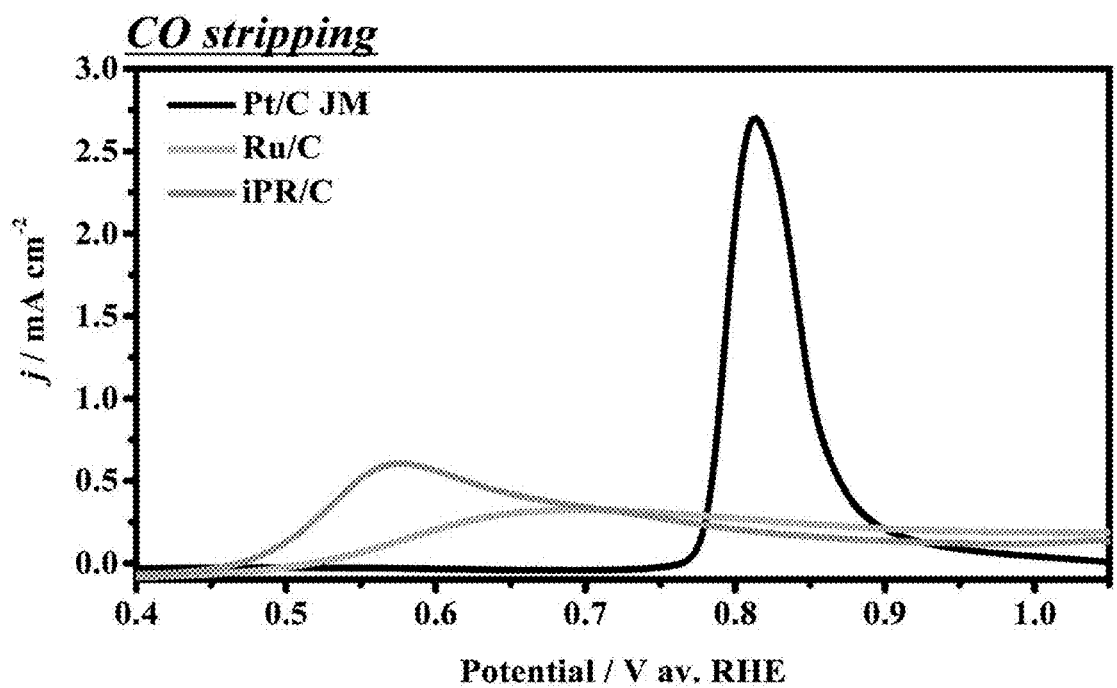
Figure 6D:
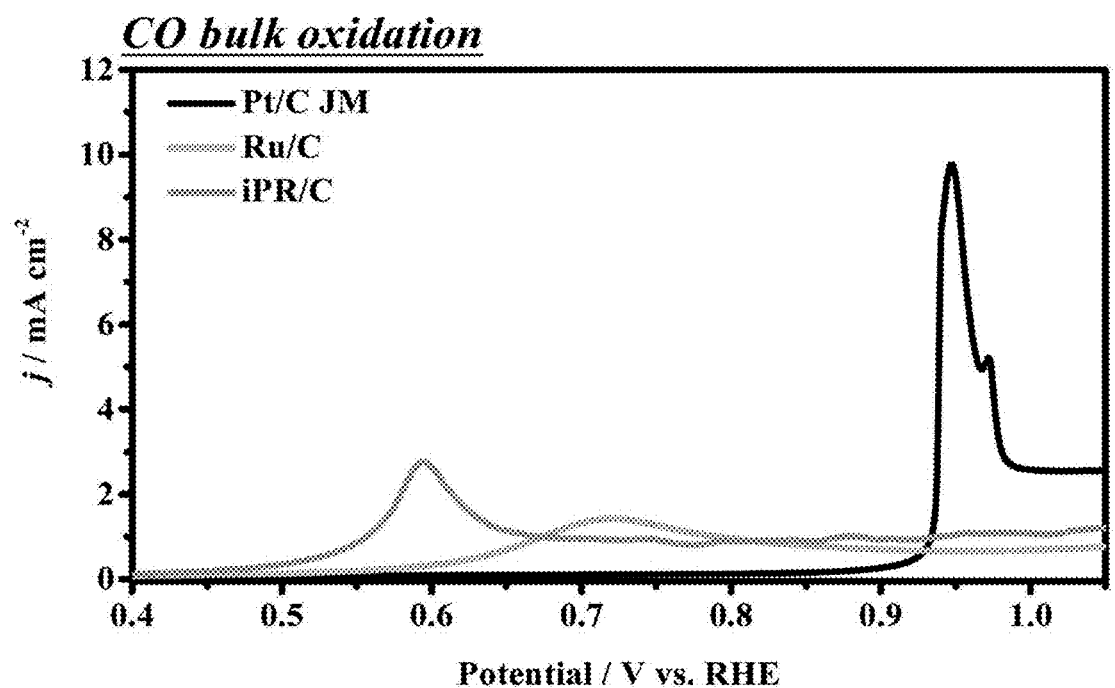

Referring to FIGS. 6A and 6B, Example 1 (iPR/C) showed a hydrogen oxidation reaction activity comparable to that of Comparative Example 1 (Pt/C) despite the low content of platinum. When the hydrogen oxidation reaction was compared under the same condition while flowing 10 ppm of $CO/H_2$ gas, the hydrogen oxidation reaction activity was decreased for the commercial platinum catalyst of Comparative Example 1 (Pt/C) as carbon monoxide was injected, whereas Example 1 (iPR/C) maintained performance as compared to when pure hydrogen gas was flown. Also, referring to FIGS. 6C and 6D, in carbon monoxide stripping (CO) stripping and carbon monoxide (CO) bulk oxidation measurement for comparing carbon monoxide resistance, the catalyst of Example 1 showed carbon monoxide oxidation at a lower voltage as compared to the commercial platinum catalyst of Comparative Example 1.

TEST EXAMPLE 5

Evaluation of Unit Cell Performance

Figure 7A:
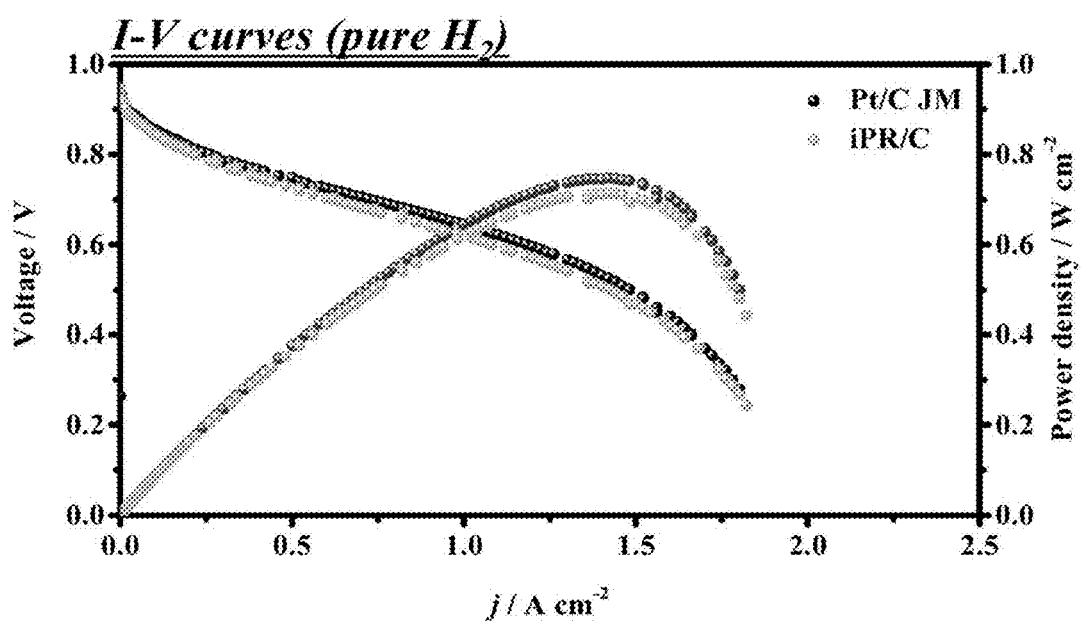
FIGS. 7A to 7C show results of measuring the performance of unit cells using catalysts prepared in Example 1 (iPR/C) and Comparative Example 1 (Pt/C) (FIG. 7A) and a result of quantifying the performance measurement result (FIGS. 7B and 7C).
Figure 7B:
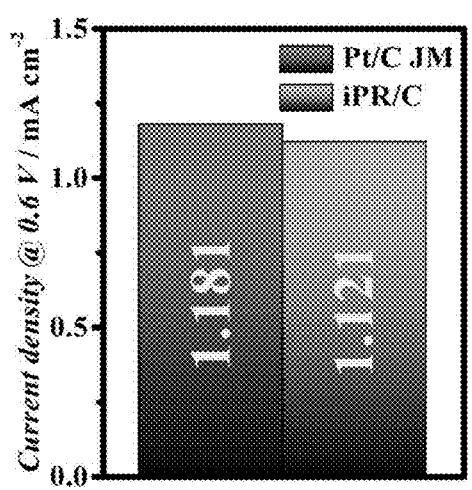
Figure 7C:
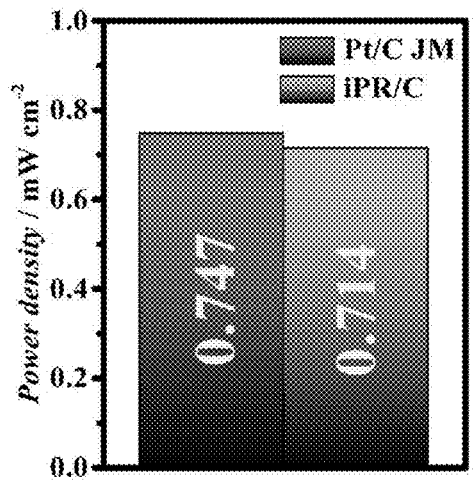

After preparing membrane-electrode assemblies using the catalysts prepared in Example 1 and Comparative Examples 1-2, unit cells were prepared by using 45% Pt/C as an air electrode. A results of analyzing the performance of the unit cells are shown in FIGS. 7A to 7C. Nafion 211 membrane was used for the unit cell performance measurement and the catalysts of the fuel electrode (0.2 mg/cm$^2$) and the air electrode (0.4 mg/cm$^2$) were loaded by the CCM method. The unit cell performance was measured at 60° C. and 100% relative humidity, and gas flown at 200 cc/min and 600 cc/min to the fuel electrode and the air electrode, respectively.

FIGS. 7A to 7C show the results of measuring the performance of unit cells using catalysts prepared in Example 1 (iPR/C) and Comparative Example 1 (Pt/C) as I-V curves and quantifying the performance measurement result.

Referring to FIGS. 7A to 7C, despite the low content of platinum (0.98 wt %), Example 1 (iPR/C) showed performance comparable to that of the commercial platinum catalyst of Comparative Example 1 with a platinum content of 20 wt % in the unit cell test. When the performance was measured while injecting 10 ppm of carbon monoxide to investigate the effect of carbon monoxide in the unit cell test, both the commercial platinum catalyst of Comparative Example 1 (Pt/C) and the catalyst for a fuel cell of Example 1 (iPR/C) showed decrease in performance, but the decrease in performance was less for Example 1 (iPR/C).

Figure 8A:
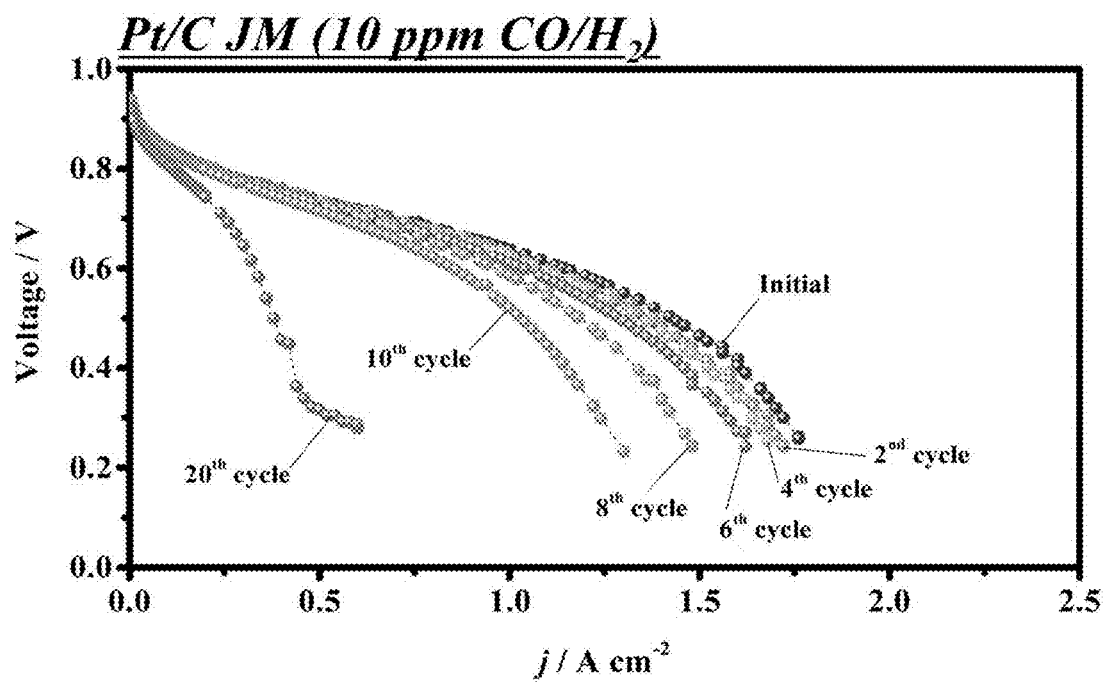
FIGS. 8A to 8C show results of evaluating the resistance to carbon monoxide poisoning of unit cells using catalysts prepared in Comparative Example 1 (FIG. 8A) and Example 1 (FIG. 8B) and a result of comparing the resistance to carbon monoxide poisoning of the unit cells using the catalysts prepared in Example 1 (iPR/C) and Comparative Example 1 (Pt/C) (FIG. 8C).
Figure 8B:
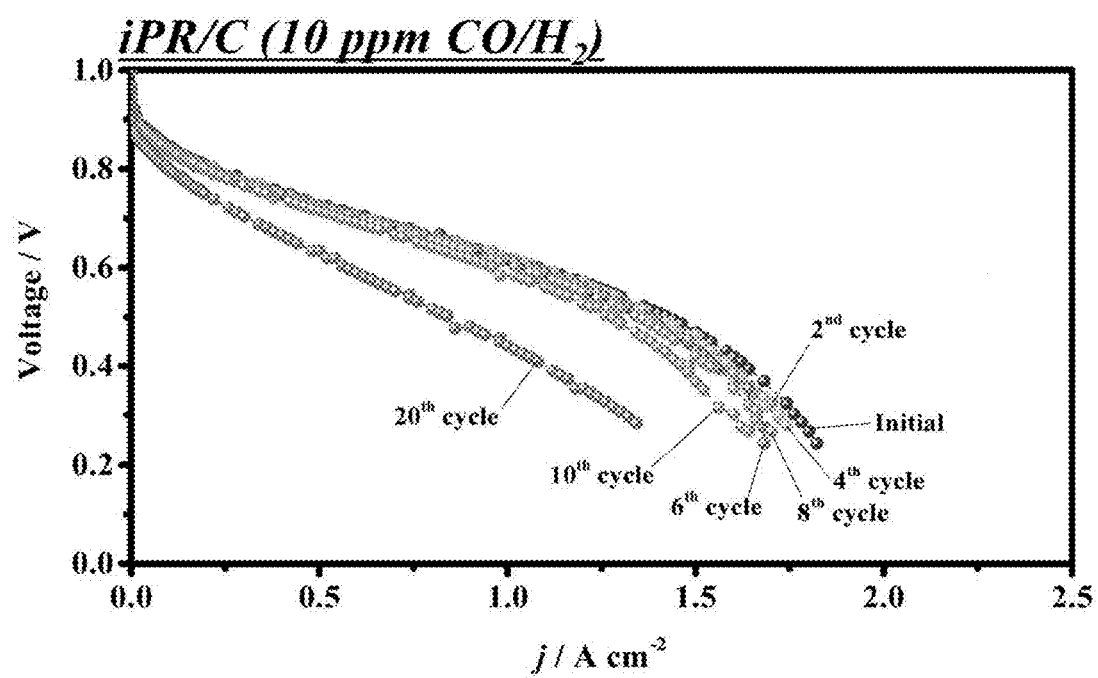
Figure 8C:
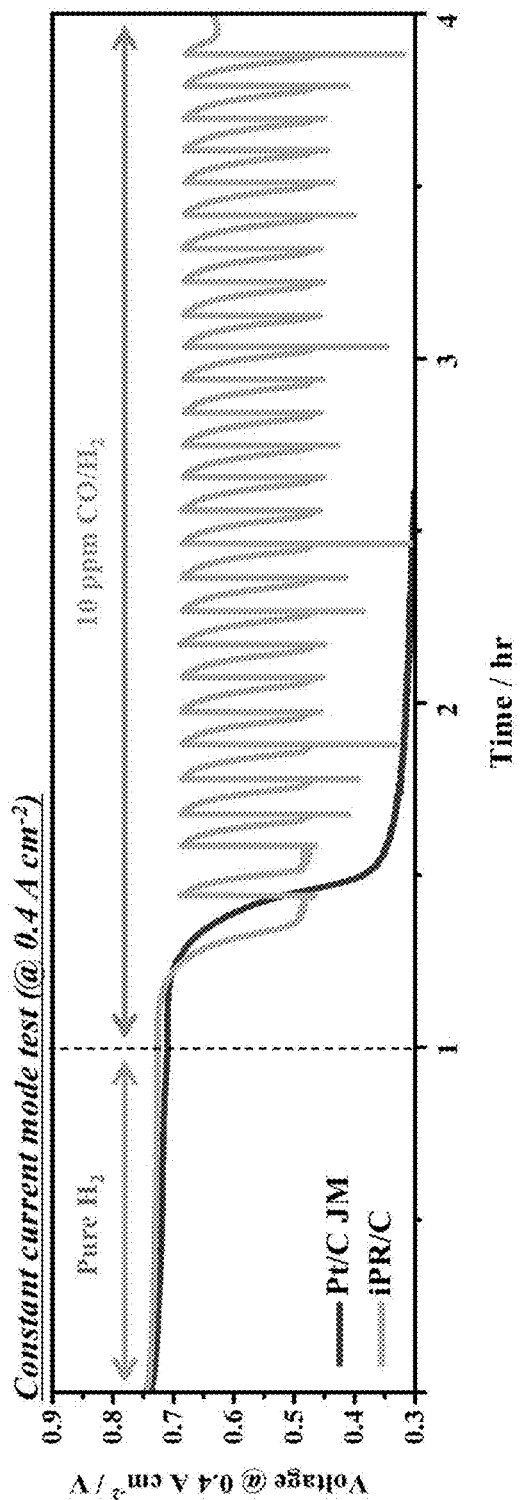

FIGS. 8A to 8C show the results of evaluating the resistance to carbon monoxide poisoning of the unit cells using the catalysts prepared in Comparative Example 1 (FIG. 8A) and Example 1 (FIG. 8B) and the result of comparing the resistance to carbon monoxide poisoning of the unit cells using the catalysts prepared in Example 1 (iPR/C) and Comparative Example 1 (Pt/C) (FIG. 8C).

Referring to FIG. 8C, in a constant-current test (@ 0.4 A/cm$^2$) with 10 ppm of carbon monoxide injection, the commercial platinum catalyst of Comparative Example 1 (Pt/C) showed decrease of cell performance below 0.3 V within 30 minutes after the injection of carbon monoxide. In contrast, Example 1 (iPR/C) showed oscillation of performance, suggesting that carbon monoxide was oxidized during the cell operation. Through this, it was confirmed that Example 1 (iPR/C) can achieve comparable cell performance even with the significantly lower content of platinum as compared to the commercial platinum catalyst of Comparative Example 1 (Pt/C) and has stronger resistance to carbon monoxide poisoning.

What is claimed is:

1. A catalyst for a fuel cell, comprising:
    a carbon support; and
    metal nanoparticles distributed on the carbon support,
    wherein some metal of the metal nanoparticles is replaced with catalyst metal single atoms, and
    wherein a molar ratio of the metal nanoparticles and the catalyst metal single atoms is 100:0.3-100:7.5.
2. The catalyst for a fuel cell according to claim 1, wherein the catalyst for a fuel cell does not exhibit a peak corresponding to Pt$^0$ as a result of X-ray photoelectron spectroscopy (XPS) analysis.
3. The catalyst for a fuel cell according to claim 1, wherein a height of a region corresponding to the catalyst metal in a line profile analysis result of a scanning transmission electron microscopy (STEM) image is higher than a height of a region corresponding to the metal of the metal nanoparticles.
4. The catalyst for a fuel cell according to claim 1, wherein the carbon support is one or more selected from the group consisting of Vulcan, carbon black, graphite carbon, acetylene black, Ketjen black, carbon nanotube, carbon nanowire and carbon nanorod.
5. The catalyst for a fuel cell according to claim 1, wherein the metal nanoparticles are one or more selected from the group consisting of ruthenium (Ru), nickel (Ni), cobalt (Co) and iron (Fe).
6. The catalyst for a fuel cell according to claim 1, wherein the catalyst metal single atoms are one or more selected from the group consisting of platinum, rhodium, palladium, osmium, ruthenium and iridium.
7. The catalyst for a fuel cell according to claim 1, wherein a standard reduction potential of the metal nanoparticles is lower than a standard reduction potential of the catalyst metal single atoms.
8. The catalyst for a fuel cell according to claim 1, wherein the metal nanoparticles have a diameter of 2-10 nm.
9. The catalyst for a fuel cell according to claim 1, wherein the catalyst metal single atoms are comprised in an amount of 0.5-3 wt % based on 100 wt % of the catalyst for a fuel cell.
10. The catalyst for a fuel cell according to claim 1, wherein the catalyst for a fuel cell does not exhibit a peak corresponding to the catalyst metal as a result of X-ray diffraction (XRD).

* * * * *